(12) United States Patent
Duplessis et al.

(10) Patent No.: US 7,805,414 B2
(45) Date of Patent: Sep. 28, 2010

(54) WIRELESS NETWORK CUSTOMIZATION

(76) Inventors: Jean-Pierre Duplessis, 5823 196th Ave. NE., Redmond, WA (US) 98053; William N. Hanlon, 1721 173rd Ave. NE., Bellevue, WA (US) 98008; Sean O. Lyndersay, 19 Ward St., #8, Seattle, WA (US) 98109

( * ) Notice: Subject to any disclaimer, the term of this patent is extended or adjusted under 35 U.S.C. 154(b) by 1141 days.

(21) Appl. No.: 11/009,858

(22) Filed: Dec. 10, 2004

(65) Prior Publication Data
US 2006/0129510 A1 Jun. 15, 2006

(51) Int. Cl.
*G06F 17/30* (2006.01)
(52) U.S. Cl. .................... 707/694; 707/695; 707/748; 707/752
(58) Field of Classification Search ............... 707/1, 707/7, 9, 10, 694, 695, 748, 752
See application file for complete search history.

(56) References Cited

U.S. PATENT DOCUMENTS

| | | | |
|---|---|---|---|
| 6,029,147 A | 2/2000 | Horadan et al. | |
| 6,282,660 B1 * | 8/2001 | Anne et al. | 713/300 |
| 6,791,581 B2 | 9/2004 | Novak et al. | |
| 2003/0101190 A1 | 5/2003 | Horvitz et al. | |
| 2003/0115267 A1 | 6/2003 | Hinton et al. | |
| 2004/0111520 A1 * | 6/2004 | Krantz et al. | 709/229 |
| 2005/0043999 A1 * | 2/2005 | Ji et al. | 705/21 |
| 2005/0091357 A1 * | 4/2005 | Krantz et al. | 709/223 |

OTHER PUBLICATIONS

Anonymous, "Boingo Wireless™ Launches Pocket Boingo Wi-Fi Software," *News: Infrastructure, Products & Services,* Issue #2002—45, 2 pgs (Nov. 2002) printed at http://www.mobileinfo.com/news_2002/Issue45/Boingo_PDA.htm on Dec. 10, 2004.

* cited by examiner

*Primary Examiner*—Baoquoc N To
(74) *Attorney, Agent, or Firm*—Marshall, Gerstein & Borun LLP (57) ABSTRACT

A branding sub-file is associated with one or more SSID's. A user interface which displays available networks takes the available branding sub-files into account when displaying the names of networks within range. If branding is available for a given SSID, it shows a rich view of the network, using the branding information, allowing the user to make a more informed choice. A sign-up sub-file is also provided. The sign-up sub-file includes information, such as a list of items, that a network desires from a user to allow the user to access the network.

24 Claims, 6 Drawing Sheets

WIRELESS NETWORK CUSTOMIZATION

FIELD OF THE INVENTION

This invention pertains generally to computer systems and, more particularly, to configuring computer systems to appropriately communicate on a network.

BACKGROUND OF THE INVENTION

Today, people use digital networks to communicate in many different ways. Speech, text, World Wide Web pages, and streaming live video are just a few examples of items that may be exchanged through a digital network.

The ability to connect to a digital network at a fixed physical location is typically done via a wired connection, such as through cable. Connecting to a digital network in this manner requires an initial registration, after which the computer typically does not require additional registration for subsequent connections. The ability to connect to a digital network while remaining mobile is quite another. Wireless digital networks are popular and becoming more so. People value the convenience and freedom offered by a wireless network.

Computer users are often provided multiple wireless networks at a given location. In contemporary computer systems, prior to making a decision about a wireless network to which to connect, a computer is provided two items of information about the wireless network. The first, the service set identifier (SSID). The SSID is a 32 character unique identifier attached to a header of packets sent over a wireless local-area network (WLAN) that acts as a password when a mobile device tries to connect to the wireless network. The SSID is essentially a network name used to identify a wireless network. This name is often short and cryptic to a potential user.

Second, the computer is provided information about whether or not the network encrypts data. If it encrypts data, the network will require an encryption key (also known as a WEP key), which can be supplied by the user typing it in, or via an 802.1x protocol.

With these two pieces of information, the user is expected to choose between multiple networks at a given location, often without knowing the terms of connecting to the wireless network, or which wireless network provides the best features for the user. Because of the very limited information provided, it is difficult to make an informed decision about which wireless network is desired, even for an advanced user.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In accordance with an embodiment, improvements are provided for a user interface for connecting to, or otherwise interacting with, wireless networks. As an example, branding of a particular network may be provided. A wireless network may provide, for example, an icon, a friendly name, and/or some identifying text such as a slogan or an enticement that is displayed to the user to help the user to identify and choose a wireless network for connection.

In accordance with an embodiment, a branding sub-file is associated with one or more SSID's. A user interface which displays networks takes the available branding sub-files into account when displaying the names of networks within range. If branding is available for a given SSID, it shows a rich view of the network, using the branding information, allowing the user to make a more informed choice.

In accordance with another embodiment, a sign-up sub-file is provided to a computer. The sign-up sub-file includes information, such as a list of items, that a network desires from a user to allow the user to access the network. In an embodiment, the sign-up sub-file is implemented by a non-executable markup language file, such as XML file, that describes the information that the network wishes to collect from the user, as well as a limited set of rules. The non-executable XML file permits a legitimate network to get the information it needs from the user, while the user is protected from having un-trusted code running on his or her computer.

In accordance with an embodiment, the use of the non-executable XML file permits a computer that accesses the sign-up sub-file to render the information in a form that meets its platform. For example, the information in the sign-up sub-file may be provided through a wizard, may be integrated in a side bar or other features of a shell user interface, or may be provided in a small form factor experience, for example for a hand-held computer.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Embodiments within the scope of the present invention include computer-readable media for carrying or having computer-executable instructions or data structures stored thereon. Such computer-readable media can be any available media that can be accessed by a general-purpose or special-purpose computer. By way of example, and not limitation, such computer-readable media may comprise physical computer-readable media such as RAM, ROM, EEPROM, CD- ROM or other optical disk storage, magnetic disk storage or other magnetic storage devices, or any other medium which can be used to carry or store desired program code means in the form of computer-executable instructions or data structures and which can be accessed by a general-purpose or special-purpose computer.

When information is transferred or provided over a network or another communications connection (either hardwired, wireless, or a combination of hardwired or wireless) to a computer system, the computer system properly views the connection as a computer-readable medium. Thus, any such connection is properly termed a computer-readable medium. Combinations of the above should also be included within the scope of computer-readable media. Computer-executable instructions comprise, for example, any instructions and data which cause a general-purpose computer system, special-purpose computer system, or special-purpose processing device to perform a certain function or group of functions. The computer-executable instruction may be, for example, binaries, intermediate format instructions such as assembly language, or even source code.

In this description and in the following claims, a "logical communication link" is defined as any communication path that can enable the transport of electronic data between two entities such as computer systems or modules. The actual physical representation of a communication path between two entities is not important and can change over time. A logical communication link can include portions of a system bus, a local area network (e.g., an Ethernet network), a wide area network, the Internet, combinations thereof, or portions of any other path that may facilitate the transport of electronic data. Logical communication links can include hardwired links, wireless links, or a combination of hardwired links and wireless links. Logical communication links can also include software or hardware modules that condition or format portions of electronic data so as to make them accessible to components that implement the principles of the present invention. Such modules include, for example, proxies, routers, firewalls, switches, or gateways. Logical communication links may also include portions of a virtual network, such as, for example, Virtual Private Network ("VPN") or a Virtual Local Area Network ("VLAN").

In this description and in the following claims, a "schema" is defined as an expression of a shared vocabulary between a plurality of computer systems that allows the plurality of computer systems to process documents according the expressed shared vocabulary. For example, an extensible Markup Language ("XML") schema can define and describe a class of XML documents using schema constructs of an XML schema language. These schema constructs can be used to constrain and document the meaning, usage, and relationships of data types, elements, and their content, attributes and their values, entities and their contents, and notations, as used in XML documents. Thus, any computer system that can access an XML schema can process XML documents in accordance with the XML schema. Further, any computer system that can access an XML schema can compose or modify XML documents for use by other computer systems that can also access the XML schema.

Schema is defined to include Document Type Definitions ("DTD"), such as, for example, DTD files ending with a ".dtd" extension. Schema is also defined to include World Wide Web Consortium ("W3C") XML Schemas, such as, for example, XML Schema files ending with an ".xsd" extension. However, the actual file extension for a particular DTD or XML schema is not important. A schema can be utilized to define virtually any data type including logical, binary, octal, decimal, hexadecimal, integer, floating-point, character, character string, user-defined data types, and combinations of these data types used to defined data structures. XML elements and attributes can be defined to represent data types that are defined by a schema. In this definition and the following claims, "schema-based" refers to being defined by and/or within a schema.

Figure 1:
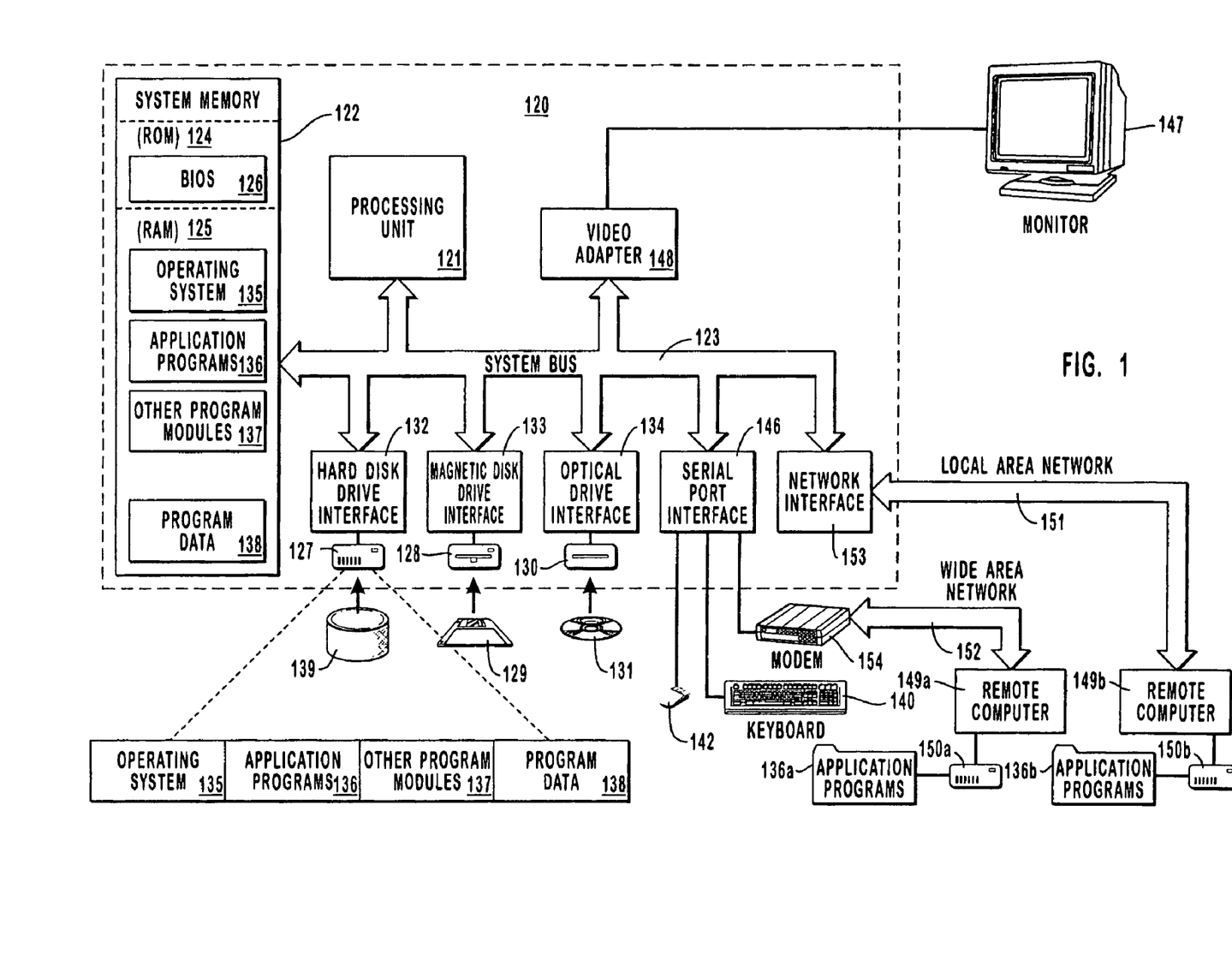
FIG. 1 is a schematic diagram generally illustrating an exemplary computer system usable to implement an embodiment of the invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions represents examples of corresponding acts for implementing the functions described in such steps.

With reference to FIG. 1, an exemplary system for implementing the invention includes a general-purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules, and other data for the computer 120. Although the exemplary environment described herein employs a magnetic hard disk 139, a removable magnetic disk 129, and a removable optical disk 131, other types of computer readable media for storing data can be used, including magnetic cassettes, flash memory cards, digital video disks, Bernoulli cartridges, RAMs, ROMs, and the like.

Program code means having one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port, or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical communication links to one or more remote computers, such as remote computers 149a and 149b. Remote computers 149a and 149b may each be another personal computer, a client, a server, a router, a switch, a network PC, a peer device or other common network node, and can include many or all of the elements described above relative to the computer 120, although only memory storage devices 150a and 150b and their associated application programs 136a and 136b have been illustrated in FIG. 1. The logical communication links depicted in FIG. 1 include local area network ("LAN") 151 and wide area network ("WAN") 152 that are presented here by way of example and not limitation. Such networking environments are commonplace in office-wide or enterprise-wide computer networks, intranets and the Internet.

When used in a LAN networking environment (e.g. an Ethernet network), the computer 120 is connected to LAN 151 through a network interface or adapter 153, which can be a wired or wireless interface. When used in a WAN networking environment, the computer 120 may include a wired link, such as, for example, modem 154, a wireless link, or other means for establishing communications over WAN 152. The modem 154, which may be internal or external, is connected to the system bus 123 via the serial port interface 146. In a networked environment, program modules depicted relative to the computer 120, or portions thereof, may be stored in at a remote memory storage device. It will be appreciated that the network connections shown are exemplary and other means of establishing communications over wide area network 152 may be used.

While FIG. 1 illustrates an example of a computer system that may implement the principles of the present invention, any computer system may implement the features of the present invention. In the description and in the claims, a "computer system" is defined broadly as any hardware component or components that are capable of using software to perform one or more functions. Examples of computer systems include desktop computers, laptop computers, Personal Digital Assistants ("PDAs"), telephones (both wired and mobile), wireless access points, gateways, firewalls, proxies, routers, switches, hand-held devices, multi-processor systems, microprocessor-based or programmable consumer electronics, network PCs, minicomputers, mainframe computers, or any other system or device that has processing capability.

Those skilled in the art will also appreciate that the invention may be practiced in network computing environments using virtually any computer system configuration. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

In accordance with the present invention, user-interface, provisioning, account maintenance, and authentication modules, as well as associated data, including provisioning data and user data may be stored and accessed from any of the computer-readable media associated with computer 120. For example, portions of such modules and portions of associated program data may be included in operating system 135, application programs 136, program modules 137, and/or program data 138, for storage in system memory 122. When a mass storage device, such as, for example, magnetic hard disk 139, is coupled to computer 120, such modules and associated program data may also be stored in the mass storage device. In a networked environment, program modules depicted relative to computer 120, or portions thereof, can be stored in remote memory storage devices, such as, for example, system memory and/or mass storage devices associated with remote computer system 149a and/or remote computer system 149b. Execution of such modules may be performed in a distributed environment as previously described.

In accordance with an embodiment, a branding sub-file is provisioned to a computer by a wireless network when the computer comes within range of the wireless network. The branding sub-file may be provided, for example, by a provisioning service, such as the provisioning service described in United States Published Application Number US2004/0111540 A1, filed Dec. 6, 2002 and published Jun. 10, 2004, entitled "Increasing the Level of Automation When Provisioning a Computer System to Access a Network", and owned by the assignee of the present invention. Although the method of provisioning a computer system in this application is well described in the application, a brief high-level description is given here for the benefit of the reader.

In general, the provisioning features described in the 2004/0111520 published application are directed to permitting a computer system to authenticate with a server to gain authorization to access a second network. The computer system is given authorization to access a first network for at least the purpose of downloading files (e.g., sign-up and configuration files) needed to access the second network.

Figure 2:
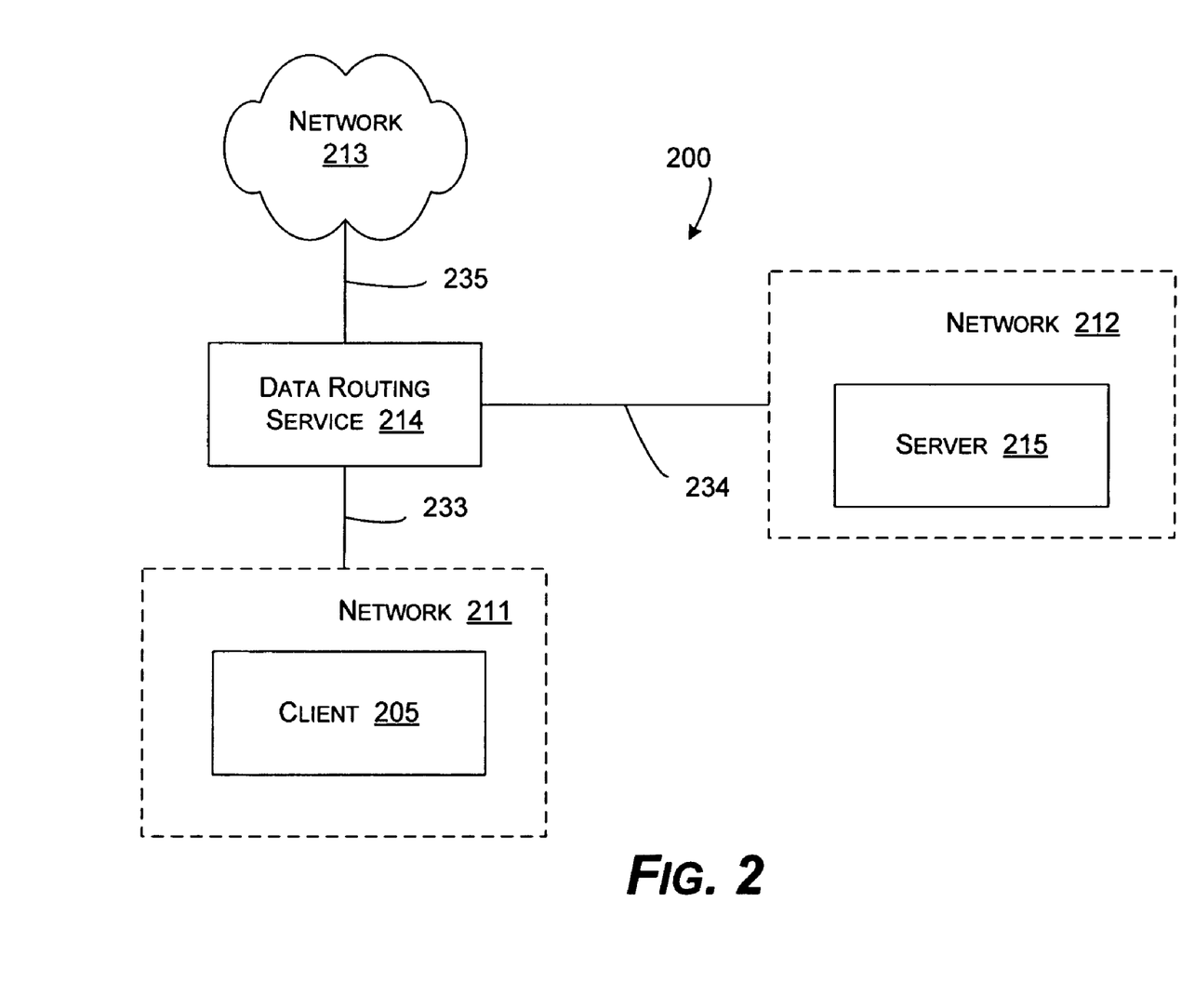
FIG. 2 is a schematic diagram generally illustrating an example high level network architecture in accordance with an embodiment of the invention.

FIG. 2 illustrates generally an example of a network architecture 200 that can provide access to a first network while restricting access to a second network (e.g., the Internet) in accordance with the 2004/0111520 published application. Network architecture 200 includes client 205 and server 215. Although not required, client 205 and server 215 may each be structured as described above for computer 120. The terms "client" and "server" are used herein to denote the fact that the client 205 receives a service, such as, for example, access to network 213, from the server 215. While client 205 and server 215 are a client and a server (respectively) in this context, the client 205 may act as a server in another context, and server 215 may act as a client in another context.

As depicted in network architecture 200, data routing device 214 is connected to network 211, network 212, and network 213 by corresponding logical communication links 233, 234, and 235 respectively. Data routing device 214 logically represents a computer system that can determine where to transfer data received from network 211, such as, for example, data received from client 205. That is, when data routing device 214 receives data from network 211, data routing device 214 can determine if the data is to be transferred to network 212 or network 213. As such, data routing device 214 can be configured to allow access to one network (e.g., network 212) while at the same time restricting access to another network (e.g., network 213). Data routing device 214 can make this determination using a variety of different techniques.

In some embodiments, access to resources located on network 213 can be restricted by the use of Virtual Local Area Networks ("VLANs"). In these embodiments, networks 211, 212 and 213 may each be a portion of a different VLAN. VLAN aware devices in network architecture 200 can "Tag"

data frames to indicate to data routing device 214 where the data frames are to be routed. For example, when client 205 is not authorized to access resources located network 213, components in network 211 or logical communication link 233 can Tag data frames from client 205 indicating that the data frames are to be routed to server 215 (or other resources located on network 212). When client 205 is authorized to access network 213, components in network 211 or logical communication link 233 can Tag data frames from client 205 indicating that the data frames are to be routed to resources on network 213 (e.g., to the Internet) or to resources on network 212 (e.g., server 212) as appropriate.

In other embodiments, access to resources located on network 213 can be restricted by the use of Internet Protocol ("IP") filtering. Data routing device 214, components in network 211, or components in logical communication link 233 can filter Internet Protocol ("IP") address to limit client 205's access to resources with particular IP addresses. When client 205 is not authorized to access resources located on network 213, IP addresses can be filtered such that client 205 is exposed to IP addresses of resources located on network 212 but is not exposed to IP addresses of resources located on network 213. When client 205 is authorized to access network 213, IP addresses can be filtered such that client 205 is exposed to IP addresses of resources located on both networks 212 and 213. Alternately, when client 205 is authorized to access network 213 IP filtering may cease altogether.

In yet other embodiments, access to resources on network 213 can be restricted by use of a Virtual Private Network ("VPN"). When client 205 is not authorized to access resources located on network 213, a VPN can be configured such that client 205 is exposed to resources located on network 212, but is not exposed to resources located on network 213. When client 205 is authorized to access resources located on network 213, a VPN can be configured such that client 205 is exposed to resources located on both networks 212 and 213. Alternately, when client 205 is authorized to access resources located on network 213 use of a VPN may cease all together.

It should be understood that VLAN, IP filtering, and VPN techniques are merely examples of some of the techniques that can be used to differentiate between networks so as to allow access to one network while restricting access to another network. It should be understood that access to a single network can be limited using VLANs, IP filtering, or VPNs. For example, a server located on network 213 can provide client 205 with limited access to resources located on network 213. It would be apparent to one skilled in the art, after having reviewed this description, that other techniques, in addition VLAN, IP filtering, and VPN techniques, can be used to allow access to one network, while restricting access to another network.

It should be further understood that techniques used to restrict access to a network may also be used to provide limited access to a network. In some embodiments, a server on a network can provide a client with limited access to the network. For example, a server located on network 213 may implement IP filtering to provide client 205 with limited access to network 213. Included in the limited access can be access to computer systems or modules that store provisioning files needed for gaining full access to network 213. Client 205 can be authorized to download provisioning files from these computer systems or modules, while being denied access to other resources located on network 213.

The server 215 provides the client 205 with a Uniform Resource Identifier ("URI") to a master document that contains information for provisioning the client. The master document may contain further URIs to sub-files or other master documents. After receiving URIs, the client can automatically download or otherwise access any appropriate provisioning files. The master document and any associated sub-files can be defined in accordance with an extensible markup language, such as eXstensible Markup Language ("XML") schemas.

The provisioning service described in the 2004/0111520 published application is but one way to provide a master document and associated sub-files to the client 205, but for the purposes of this document, the files provisioned to the client are termed "sub-files" herein. However, the sub-files may be provided to computer in another manner than the provisioning service described in the 2004/0111520 published application.

Figure 3:
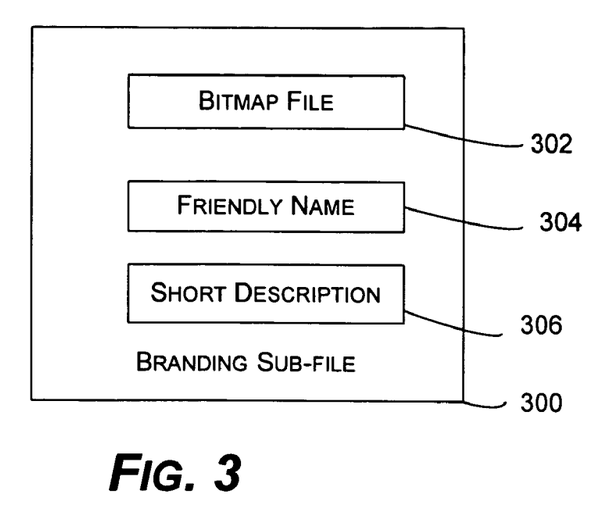
FIG. 3 is a diagrammatic representation of a branding sub-file in accordance with an embodiment of the invention.

FIG. 3 shows an example of a branding sub-file 300 that may be provided as part of the provisioning service in accordance with an embodiment. In the embodiment shown, the branding sub-file 300 includes a bitmap file 302, a friendly name 304, and a short description 306. However, a branding sub-file may include any subset of these items, and/or may include additional items. The bitmap file 302 may be, for example, an icon provided by a wireless network. The friendly name 304 may be a name understood by many users so that the network is easily identified. The short description 306 may include advertising slogans, pricing information, and/or pricing specials, among other things.

The branding sub-file 300 is associated with one or more SSID's, or similar identifiers. The branding sub-file 300 may be provisioned as described above. For example, a link to the branding sub-file 300 via a uniform resource identifier (URI) may be provided in a master document. The branding sub-file 300 may be located in a remote location and downloaded by a computer. Alternatively, a number of branding sub-files may be provided on a computer, such as the client 205, for example by a computer vendor or may be provided as part of a software package that may later be added on the computer. In such an embodiment, when a user is provided a SSID, the associated branding sub-file 300 for the SSID, if available, is accessed by the computer.

Figure 4:
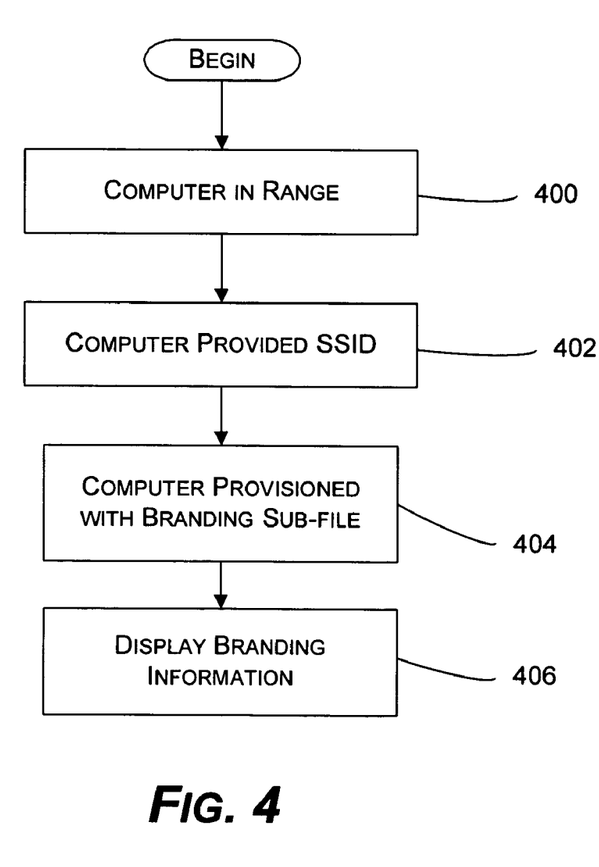
FIG. 4 is a flowchart depicting example steps for provisioning and utilizing a branding sub-file in accordance with an embodiment of the invention.

FIG. 4 shows an exemplary embodiment of steps for displaying branding information from the branding sub-file 300 in accordance with an embodiment. Beginning at step 400, a computer comes in range of a wireless network. At step 402, the computer is provided the SSID for the wireless network. At step 404, the computer is provisioned with the branding sub-file 300. After being provided the branding sub-file 300, information in the branding sub-file is displayed to a user in step 406. This information may be displayed, for example, within the typical connection user interface for the computer.

Figure 5:
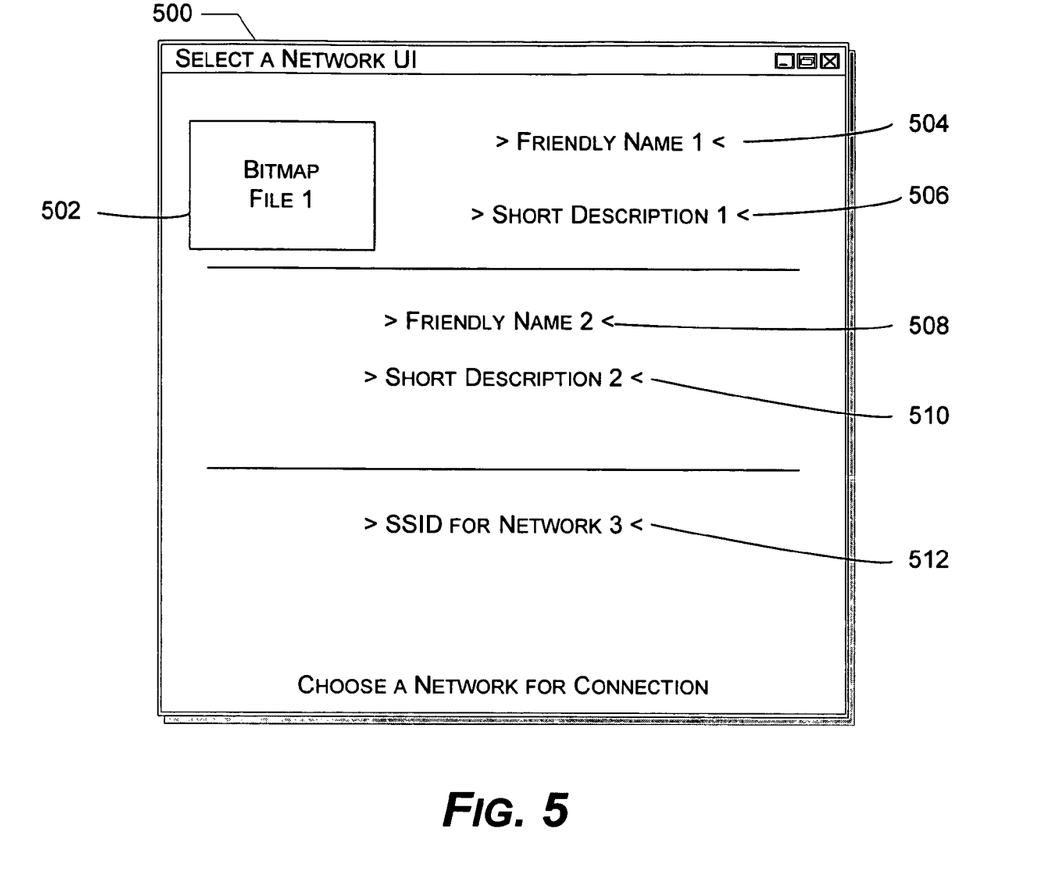
FIG. 5 is a representation of a user interface displaying branding information from a branding sub-file in accordance with an embodiment of the invention.

FIG. 5 shows a display of a user interface that may be provided, for example, by a laptop computer. The user interface 500 is the user interface provided by the laptop by indicating available wireless networks. In the example shown, three different wireless networks are available. The first two each have branding sub-files, such as the branding sub-file 300 available. The laptop computer, because of instructions in the computer, displays an icon 502, a friendly name 504, and a short description 506 for a first of the wireless networks. A different set of instructions tells the laptop computer to display only the friendly name 508 and short description 510 for the second wireless network. For the third wireless network, only the SSID information is available, and that SSID information 512 is displayed for that wireless network. As described above, the computer may display any number of items from the branding sub-file 300 and may choose to display the particular wireless networks in a particular order based upon the branding sub-file 300 or the SSID of the wireless network.

Figure 6:
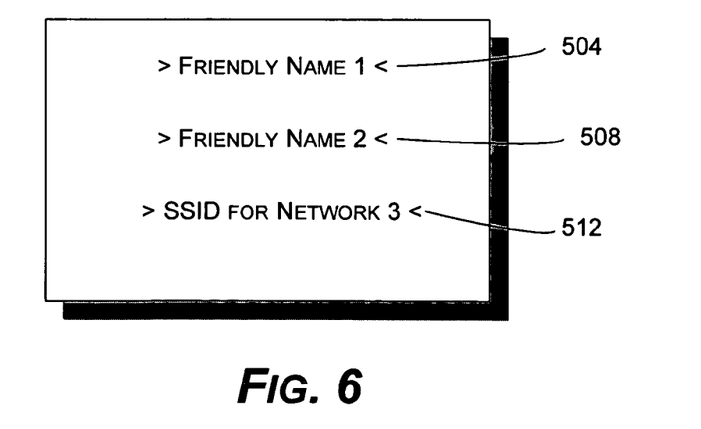
FIG. 6 is a representation of an alternate embodiment of a user interface displaying branding information from a branding sub-file.

FIG. 6 shows a second example of a user interface 600 that may be provided, for example, by a hand-held computer or device. In this example, space within the user interface 600 is limited, so that the hand-held device displays only a friendly name for the two wireless networks that have available branding sub-files 300. The user interface 600 displays the SSID information 512 for the third wireless network.

In accordance with an embodiment, the branding sub-file 300 stores all of its branding information, such as the bitmap file 302, the friendly name 304, and the short description 306, in an extensible markup language file, such as an XML file. The information is stored in accordance with a schema that may be accessed and used by computers, such as the client 205. XML allows designers to create their own customized tags, enabling the definition, transmission, validation, and interpretation of data between applications and between organizations. By utilizing the XML file, a number of different computers, including hand-held devices, tablet PCs, and laptop computers, may access and choose to display the information within the branding sub-file differently. As an example, a hand-held device may choose to display only the bitmap file 302 or only the friendly name 304. A laptop computer, which typically has a larger screen, may choose to display the bitmap file 302, the friendly name 304, and the short description 306. The information may be stored within customized tags and accessed by computers and displayed as desired.

A computer may also be programmed to take available branding sub-files 300 into account when displaying the names or other branding information of wireless networks within range. For example, a computer may be programmed to place branding information associated with a particular SSID at a top of a list, or to more prominently display particular branding information for some wireless networks. In addition, a bit or other information within the SSID may request the display of particular information within the branding sub-file 300. In either event, if branding is available for a given SSID, a richer view of the wireless network may be provided, enabling a user to make a more informed choice regarding use of a network.

Figure 7:
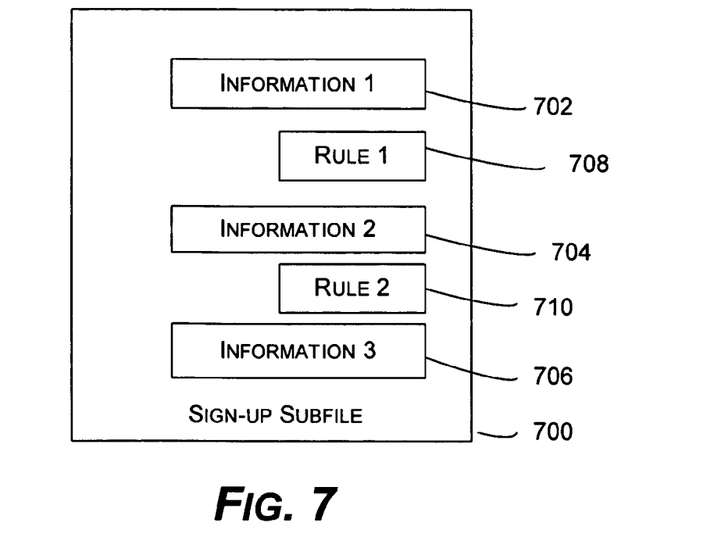
FIG. 7 is a diagrammatic representation of a sign-up sub-file in accordance with an embodiment of the invention.

In accordance with an embodiment, a sign-up sub-file, such as the sign-up sub-file 700 shown in FIG. 7, may be provisioned to the client 205. This sign-up sub-file 700 may be provisioned in the same manner as the branding sub-file 300 or in a different manner. The sign-up sub-file 700 permits a user to sign-up for service from a network, such as an Internet Service Provider (ISP). The network does not have to be wireless. The sign-up sub-file 700 is utilized by the computer to collect information that the network desires from the user in order to allow the user to access the network. This information may be, for example, a coupon code, a credit card and related information, bank draft information, or other information that may be needed by a network.

In accordance with an embodiment, the sign-up sub-file 700 is an extensible markup language file, such as an XML file, that includes and describes the data or information that the network wishes to collect from a user. The information or data may be stored in accordance with a schema. In the sign-up sub-file 700, this information may be included as the three informations 702, 704, and 706, for example. The XML file may also include a set of rules or a single rule for the information. In the example shown, rules 708 and 710 are provided for the information 702 and 704, respectively. The rules may be, for example, that a given piece of information may be mandatory or optional, that a response to one information within a particular data field may require a certain amount of numbers, or other rules as deemed appropriate.

The use of the non-executable XML file provides an advantage in that a network may define the information it needs from the user and provide that information without having to provide code to the user's computer. As such, the use of the non-executable file is much safer for a computer, such as the client 205.

The platform that accesses the sign-up sub-file may choose to render the required information in the sign-up sub-file in accordance with its own desires, such as to meet the requirements of a user community or the particular platform. As an example, for an operating system, a wizard may be provided, or the experience may be integrated in a sidebar or within other existing features of the shell user interface for the operating system. For a hand-held device, a small form factor experience may be provided.

Figure 8:
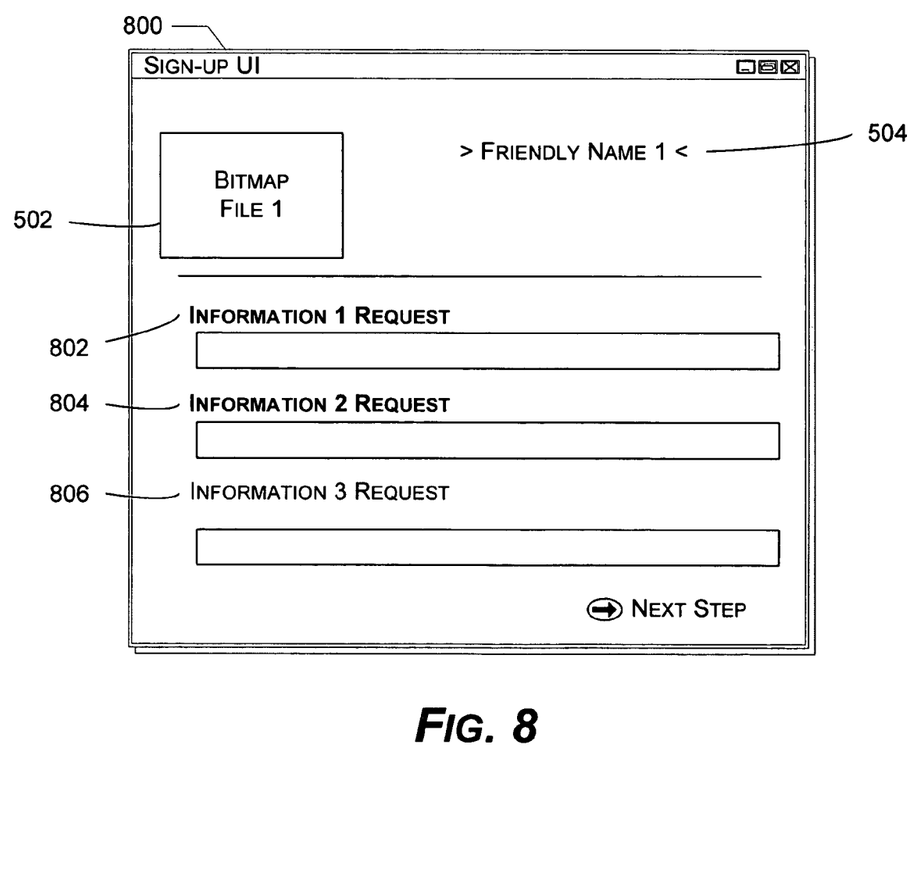
FIG. 8 is a representation of a user interface displaying information from a sign-up sub-file in accordance with an embodiment of the invention.

An example of a user interface 800 is shown in FIG. 8. In this embodiment, requests for the three informations 702, 704, 706 are provided as information requests 802, 804, and 806. In the example shown, the information requests 802, 804 are highlighted to indicate that the information 702, 704 in each of these two requests is mandatory. The platform displaying the information knows that the informations are mandatory from the rules 708, 710. After the information is entered on the user interface 800, the user may actuate a submit button 808, which may automatically result in an additional screen (for example requesting further information), or may result in a round trip to the network. In either event, submitting the information may result in another screen being displayed, for example in a wizard context, or may result in authenticating the user and permitting the user connection to the network. If a second screen or even additional screens are provided, these screens may be provisioned as described above, and required information for the additional screens may be provided by the sign-up sub-file 700 or additional sign-up sub-files.

In accordance with an embodiment, the branding information provided by the branding sub-file 300 may be utilized on the user interface for sign-up. As an example, in FIG. 8, the user interface 800 includes the icon 502 and the friendly name 504. Providing this branding information on a screen or subsequent screen of a wizard or other user interface for sign-up gives a user visual feedback that the user is actually providing this information to the network associated with the branding information. As such, a user may be more comfortable providing personal information, such as credit card information or bank account information.

Figure 9:
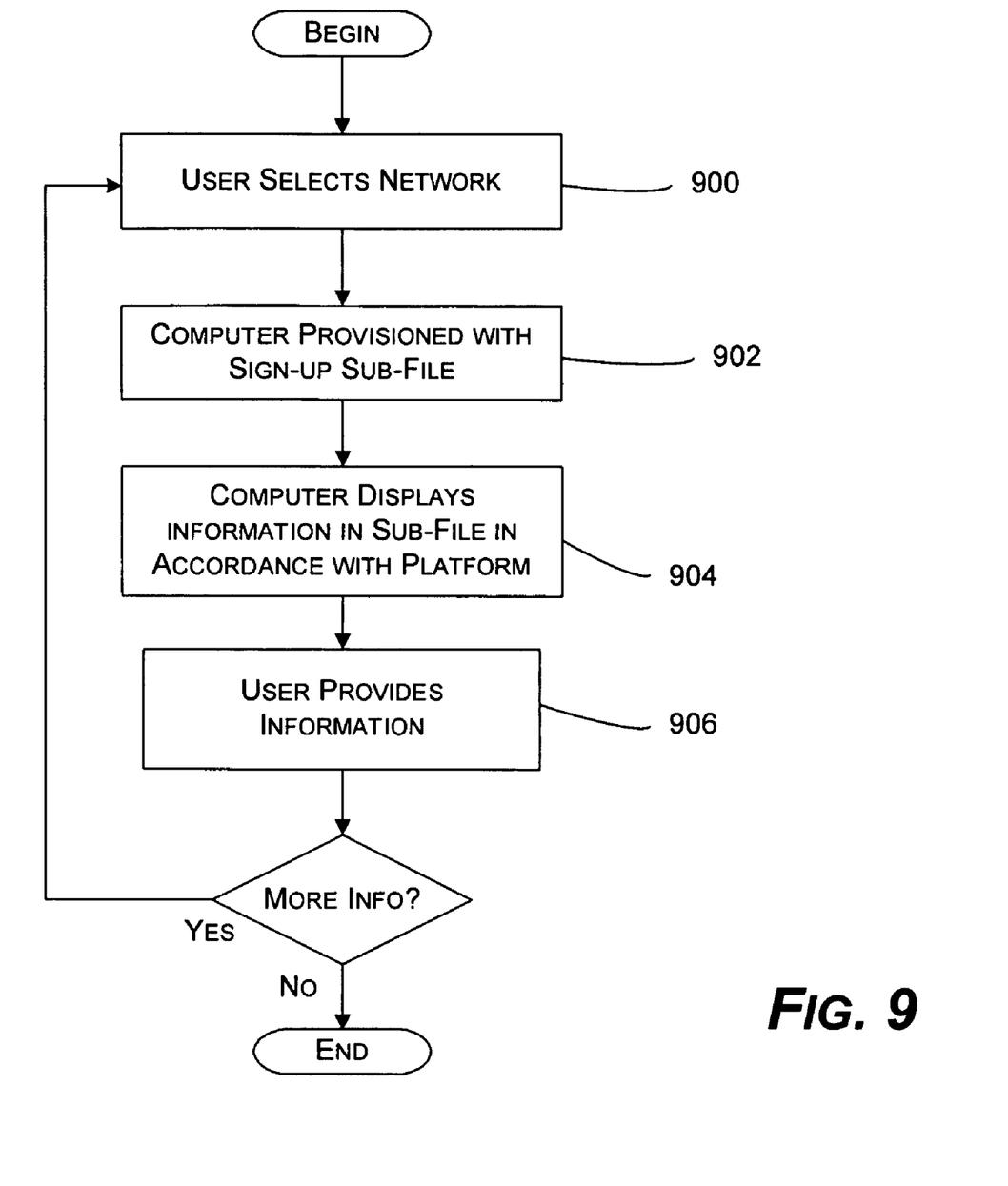
FIG. 9 is a flowchart depicting example steps for provisioning and utilizing the sign-up sub-file in accordance with an embodiment of the invention.

FIG. 9 shows steps for providing sign-up information in accordance with an embodiment of the invention. Beginning step 900, a user selects a network, for example after selecting branded information provided via step 402.

At step 902 the computer is provisioned with the sign-up sub-file, such as the sign-up sub-file 700. At step 904, the computer displays information in the sub-file in accordance with the platform of the particular computer. At step 906, the user provides the information to the network, such as by filling in blank data fields and then actuating a submit button, such as the submit button 808. At step 908, a determination is made whether or not additional screens or information is needed. If so, step 908 branches back to step 902, where the computer is provisioned with an additional sign-up sub-file or may access the sign sign-up sub-file to provide additional screens or to request additional information in another manner. If not, then the process terminates, for example in authentication or perhaps in a failure to authenticate, for example because a credit card number may be fraudulent.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A physical computer readable medium having thereon computer-executable instructions for performing a method of provisioning a network comprising:
    receiving a signal on a computing device from a network wherein the signal comprises:
    a network name;
    a sign-up file, comprising a non-executable markup language file, that includes user information to be collected to allow access to the network and a sign up rule associated with the information to be collected to allow access to the network, wherein the sign-up file further comprises a plurality of information desired by the network for a user to establish a connection with said at least one network, wherein the plurality of information comprises
    a request for credit card information,
    name information,
    personal information, or
    a subset thereof;
    determining if the network is associated with a branding file wherein the branding file comprises an icon image associated with the network, the image identifying the network from other networks;
    determining a display order by ranking the networks based on a ranking previously stored on the computing device;
    if the network is associated with a branding file,
        displaying a sign-up display using the network name, the image from the branding file that is appropriate for the computing device and the sign-up file information;
    if the network is not associated with a branding file,
        displaying a sign-up display that is appropriate for the computing device using the network name and the sign-up file information;
    accepting an input; determining if the input satisfies the sign-up-rule;
    if the input does not satisfy the sign-up-rule,
        repeating the accepting an input and determining steps from a user block;
    if the input does satisfy the sign-up-rule, and
    provisioning the computing device using the sign-up file.

2. The physical computer readable medium of claim 1, wherein the display order changes in response to received sign-up rules.

3. The physical computer readable medium of claim 1, wherein the ranking is user selected.

4. The physical computer readable medium of claim 1, wherein the rule comprises determining whether the credit card is valid.

5. The physical computer readable medium of claim 1, wherein the rule comprises determining if the personal information is valid.

6. The physical computer readable medium of claim 1, wherein the network name comprises a service set identifier (SSID).

7. The physical computer readable medium of claim 1, wherein provisioning comprises providing a uniform resource indicator to the sign-up file.

8. The physical computer readable medium of claim 1, wherein accepting an input further comprises displaying a wizard for entry of information by a user.

9. A computer-implemented method of accessing a network, comprising:
    receiving a signal from a network on a computing device wherein the signal comprises:
    a network name;
    a sign-up file, comprising a non-executable markup language file, that includes user information to be collected to allow access to the network and a sign up rule associated with the information to be collected to allow access to the network, wherein the sign-up file further comprises a plurality of information desired by the network for a user to establish a connection with said network, wherein the plurality of information comprises a request for credit card information, name information, personal information, or a subset thereof;
    determining if the network is associated with a branding file wherein the branding file comprises an icon image associated with the network, the image identifying the network from other networks;
    determining a display order by ranking the networks based on a ranking previously stored on the computing device;
    if the network is associated with a branding file,
        displaying a sign on display using the network name, the image from the branding file that is appropriate for the computing device the sign-up file and the display order;

if the network is not associated with a branding file,
   displaying a sign-up display that is appropriate for the computing device using the network name, a sign-up file and the display order;
   accepting an input;
   determining if the input satisfies the sign-up-rule;
   if the input does not satisfy the sign-up-rule,
   repeating the accepting an input and determining steps from a user block;
if the input does satisfy the sign-up-rule, and
provisioning the computing device using the sign-up file.

10. The computer implemented method of claim 9, wherein the display order changes in response to received sign-up rules.

11. The computer implemented method of claim 9, wherein the ranking is user selected.

12. The computer implemented method of claim 9, wherein the rule comprises determining whether the credit card is valid.

13. The computer implemented method of claim 9, wherein the rule comprises determining if the personal information is valid.

14. The computer implemented method of claim 9, wherein the network name comprises a service set identifier (SSID).

15. The computer implemented method of claim 9, wherein provisioning comprises providing a uniform resource indicator to the sign-up file.

16. The computer implemented method of claim 9, wherein accepting an input further comprises displaying a wizard for entry of information by a user.

17. A computer system comprising a processor, a memory and an input-output circuit, the processor being physically configured according to computer executable instruction, the computer instructions comprising
   instructions for accessing a network, the computer instructions further comprising instructions for:
   receiving a signal from a network on a computing device wherein the signal comprises:
   a network name;
   a sign-up file wherein the sign-up file comprises a non-executable markup language file and wherein the sign-up file further comprises a plurality of user information desired by the network for a user to establish a connection with said a network wherein the plurality of information comprises
      a request for credit card information,
      name information, personal information, or
      a subset thereof; and
      a sign-up rule;
   determining if the network is associated with a branding file wherein the branding file comprises an icon image associated with the network, the image identifying the network from other networks;
   determining a display order by ranking the networks based on a ranking previously stored on the computing device;
   if the network is associated with a branding file,
      displaying a sign-up display using the network name, the image from the branding file that is appropriate for the computing device the sign-up file and the display order; if the network is not associated with a branding file, displaying a sign-up display that is appropriate for the computing device
      using the network name, a sign-up file and the display order;
   accepting an input;
   determining if the input satisfies the sign-up-rule;
      if the input does not satisfy the sign-up-rule,
      repeating the accepting an input and determining steps from a user block;
   if the input does satisfy the sign-up-rule, and provisioning the computing device using the sign-up file.

18. The computer system of claim 17, wherein the display order changes in response to received sign-on rules.

19. The computer system of claim 17, wherein the ranking is user selected.

20. The computer system of claim 17, wherein the rule comprises determining whether the credit card is valid.

21. The computer system of claim 17, wherein the rule comprises determining if the personal information is valid.

22. The computer system of claim 17, wherein the network name comprises a service set identifier (SSID).

23. The computer system of claim 17, wherein provisioning comprises providing a uniform resource indicator to the sign-up file.

24. The computer system of claim 17, wherein accepting an input further comprises displaying a wizard for entry of information by a user.

* * * * *